US006992291B2

(12) United States Patent
Porter et al.

(10) Patent No.: US 6,992,291 B2
(45) Date of Patent: Jan. 31, 2006

(54) TESTING RESISTANCE BOLOMETER ARRAYS

(75) Inventors: Stephen George Porter, Towcester (GB); John Fox, Kislingbury (GB); Bhajan Singh, Birmingham (GB)

(73) Assignee: Infrared Integrated Systems Limited, Northants (GB)

( * ) Notice: Subject to any disclaimer, the term of this patent is extended or adjusted under 35 U.S.C. 154(b) by 571 days.

(21) Appl. No.: 10/097,482

(22) Filed: Mar. 14, 2002

(65) Prior Publication Data

US 2002/0153489 A1 Oct. 24, 2002

(30) Foreign Application Priority Data

Mar. 16, 2001 (GB) ............................................ 0106625

(51) Int. Cl.
*G01J 5/20* (2006.01)

(52) U.S. Cl. .................................... 250/332; 250/338.1

(58) Field of Classification Search .............. 250/338.1, 250/338.2, 338.3, 338.4, 330, 332, 349
See application file for complete search history.

(56) References Cited

U.S. PATENT DOCUMENTS 4,752,694 A 6/1988 Hegel, Jr. et al.
5,811,808 A 9/1998 Cannata et al.
6,683,310 B2 * 1/2004 Wood ...................... 250/338.1

FOREIGN PATENT DOCUMENTS

JP 09126897 5/1997
WO WO 97/01926 1/1997

OTHER PUBLICATIONS

U.S. patent application Ser. No. 09/558,279, Hollock et al., filed Apr. 25, 2000.
U.S. patent application Ser. No. 09/579,636, Galloway et al., filed May 26, 2000.
U.S. patent application Ser. No. 09/643,099, Galloway, filed Aug. 21, 2000.
U.S. patent application Ser. No. 09/805,091, Galloway, filed Mar. 13, 2001.
U.S. patent application Ser. No. 09/826,126, Carter et al., filed Apr. 4, 2001.
U.S. patent application Ser. No. 09/912,242, Galloway, filed Jul. 23, 2001.
U.S. patent application Ser. No. 10/005,883, Whatmore, filed Dec. 3, 2001.
U.S. patent application Ser. No. 10/022,966, Porter et al., filed Dec. 13, 2001.
U.S. patent application Ser. No. 10/028,940, Porter et al., filed Dec. 21, 2001.
U.S. patent application Ser. No. 10/071,589, Carter, filed Feb. 8, 2002.
U.S. patent application Ser. No. 10/094,910, Porter et al., filed Mar. 11, 2002.
EP Search Report, Application No. 02251807.0–2217, dated Apr. 5, 2004.

* cited by examiner

*Primary Examiner*—Constantine Hannaher
*Assistant Examiner*—Timothy Moran
(74) *Attorney, Agent, or Firm*—Patterson & Sheridan, L.L.P.

(57) ABSTRACT

A method of testing resistance bolometer arrays involves applying different voltages to different bolometers so as to produce a detectable difference between adjacent bolometers under normal conditions. The voltages may be applied in a recognizable pattern so that faults can be readily identified from a visual display of the array.

16 Claims, 1 Drawing Sheet

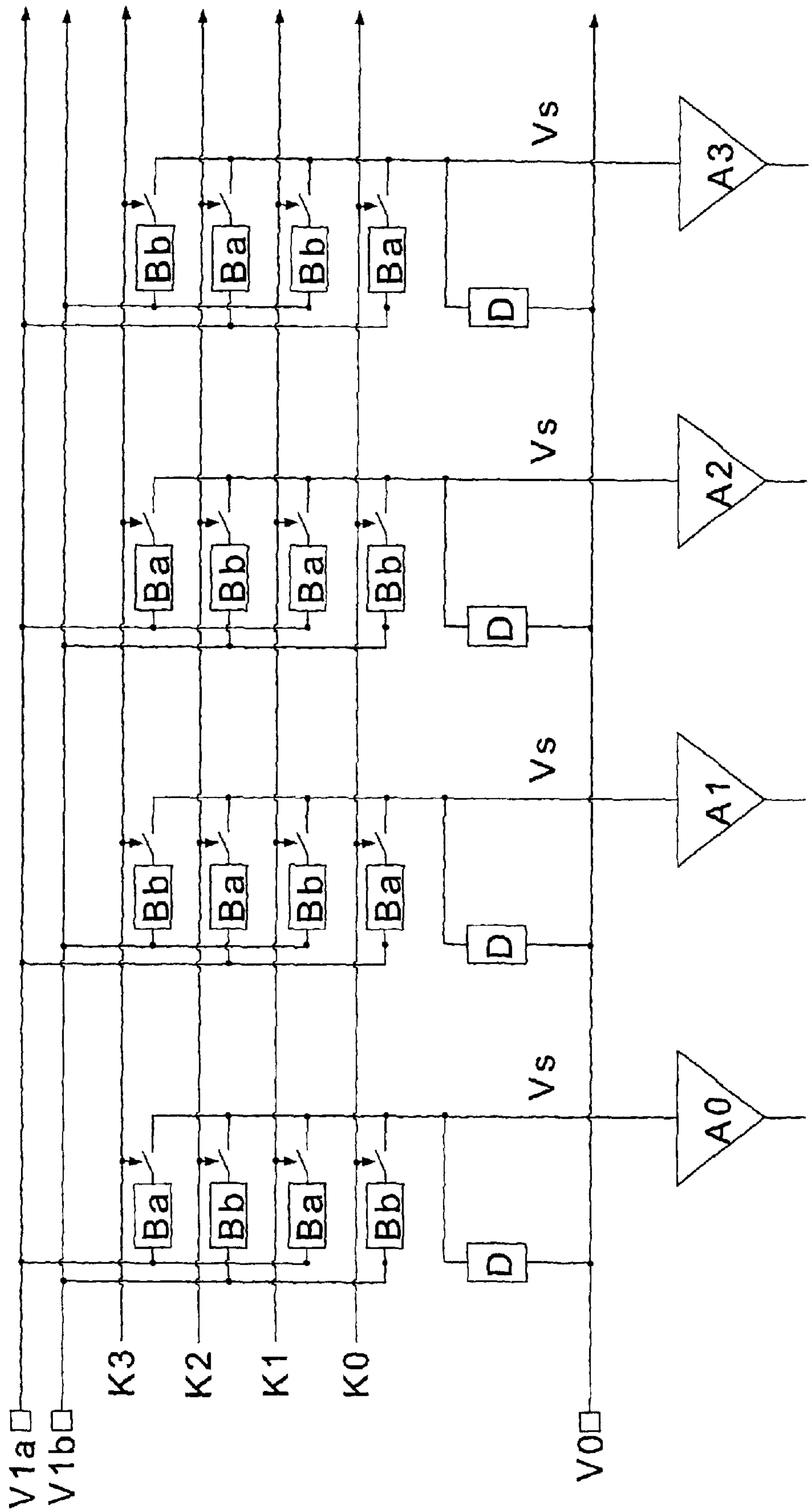
V1a
V1b
K3
K2
K1
K0
V0
Ba
Bb
D
Vs
A0
A1
A2
A3

TESTING RESISTANCE BOLOMETER ARRAYS

BACKGROUND OF THE INVENTION

The present invention relates to an infrared sensor comprising an array of resistance bolometer infrared (IR) detectors.

A resistance bolometer infrared detector is typically operated in a resistive potential divider configuration in which one resistor (the sensing bolometer) has a variable resistance due to incident infrared radiation and a second resistor has a substantially constant reference resistance. Typically the reference resistor is constructed in a similar fashion to the sensing bolometer to provide matching over manufacturing tolerances, but constructed in such a way that the thermal conductivity between the bolometer and the substrate is much higher than for the sensing bolometers. In this circuit configuration, the resistive potential divider would be driven with fixed voltage sources. The infrared radiation would then be detected by sensing and measuring a voltage change at the centre connection node of the potential divider caused by the change in resistance in the detector bolometer. In a bolometer array, the driving voltages would be connected to all bolometer elements (potential dividers) in the array. Typically, such bolometers would be connected to an amplifier through a multiplexing switch arrangement. Because all bolometers are connected in this common fashion, there is no means of providing a test stimulus to the individual bolometers that can clearly isolate bolometers from their near neighbours to determine the existence of manufacturing and circuit faults.

SUMMARY OF THE INVENTION

The present invention provides a method of testing an array of resistance bolometer detector elements having means for detecting infrared radiation by sensing and detecting a voltage and/or current change at a circuit connection node associated with each detector element, the method comprising applying at least two different voltages to the elements of the array so that each element is at a different voltage from at least one of its immediate neighbours.

In the preferred embodiment of the invention, two different voltages are applied to alternate elements of the array. In a typical application, the voltage and/or current change at the connection nodes would be read out sequentially. Thus, with the same voltage applied to all of the detector elements under ambient conditions the output would be a DC signal. With two different voltages applied to alternate elements of the array, the result will be an AC output, for example a square wave, which would be easier to measure. The method of the invention can be simplified by forming a visual image of the array indicating the voltages present at the detector elements when at least two different voltages are applied. If the different voltages are applied in a visually recognisable pattern, such as a chequerboard pattern, any irregularity such as a fault at one of the detector elements is easily recognised. Additionally or alternatively, it is possible to measure the difference in voltage between the connection node of each detector element and the connection node of an immediately adjacent element at a different applied voltage. Under ambient conditions and in the absence of any fault, this difference should reflect the difference between the applied voltages.

The method can be used to test faults in the detector elements themselves or it can be used to test faults in the circuitry associated with the individual detector elements, such as the detector element amplifiers.

The invention also provides a circuit comprising an array of resistance bolometer detector elements, a voltage source applying a voltage across each detector element, means for detecting infrared radiation by sensing and detecting a voltage and/or current change at a circuit connection node associated with each detector element, and means for testing the detector elements and/or their associated circuitry by applying at least two different voltages to the detector elements whereby each element is at a different voltage from at least one of its immediate neighbours.

An embodiment of the invention will now be described by way of example only and with reference to the accompanying drawing which is a schematic circuit diagram of an array according to the invention. For simplicity, an array of 4×4 elements is shown, but the principles apply to larger arrays.

BRIEF DESCRIPTION OF THE DRAWINGS

In the drawing, an array of resistance bolometers B are arranged in rows and columns. The bolometers of a column have a common sense line Vs to which they are connectable via a multiplexing switch arrangement controlled by signals K0, K1, K2 and K3. Each Vs line is connected to a column amplifier A0, A1, A2, A3. Alternate bolometers Ba are connected to supply rail V1*a* and, via reference bolometer D, supply rail V0. The remaining alternate bolometers Bb are connected between supply rail V1*b* and, via reference bolometer D, supply rail V0.

Thus, the illustrated bolometer array is partitioned into two interleaved halves, where one half is connected to a power source supply voltage V1*a*, and the other half to another power supply voltage V1*b*. In normal detector operation, the power supplies V1*a* and V1*b* are connected together, and to the same power supply voltage, V1.

In test, the bolometer array power supply connections V1a and V1b are separated and are driven separately. In one example the value of V1a is reduced by an amount ΔV1 as compared to V1, and the value V1b is increased by ΔV1 as compared to V1. This differential driving of V1a and V1b has the effect of creating a chequerboard pattern across the array; i.e. alternate elements are lifted and depressed by ΔV1 from the average voltage level, thus generating in voltage of 233 ΔV1 between adjacent elements, with odd elements in a row or column being high and even elements being low. Alternatively, the value of V1a is increased by an amount ΔV1, and the value of V1b is decreased by ΔV1, resulting in a similar chequerboard pattern with odd elements in a row or column low and even elements high. The voltage increase or decrease can be sensed at the central nodes NO, N1, N2, N3, giving a difference in voltage between adjacent bolometers equal to (2×ΔV1)×D/(D+B). By this means, faults such as incorrect values of the average voltage level, thus generating a difference in bolometer resistances, adjacent bolometers being shorted together, or one or more of the amplifiers having incorrect gain, may be detected as a departure from this difference voltage. The variation may be detected automatically by suitable electronic means.

Alternatively, the pattern of voltages detected at the nodes may be displayed on a visible display such as a computer monitor. With no fault and under normal ambient conditions a chequerboard pattern will be displayed and any deviation from this will be easily recognised.

A similar effect can be achieved by partitioning the bolometer array negative power supply voltage V0 and driving in a similar way. Alternatively both V0 and V1 may be partitioned and, in test, both V0a and V1a increased by an amount ΔV and both V0b and V1b decreased by an amount ΔV. This will produce a voltage difference at Vs between adjacent bolometers of 2×ΔV.

In some bolometer arrays the fixed resistor D is replaced with a constant current source. In this case, a detector bolometer will sense infrared radiation by a change of resistance, which in turn causes a change in voltage across the bolometer. If the bolometers are referenced to V1*a* and V1*b* then a chequerboard pattern at the central sense node will be created in a similar fashion as before.

The chequerboard pattern so developed at the sense point can be used to test any amplifier or other circuitry connected to the sense point.

In another alternative arrangement, the nodes N could be connected to the inverting inputs of the amplifier in which case a change in incident radiation would manifest itself as a change in current flowing at N.

In another alternative arrangement V1 and/or V0 may be partitioned into more than two independent lines so that, for example, a more sophisticated pattern than a simple chequerboard pattern may be achieved. This may be particularly appropriate for arrays in which the output signals are multiplexed into more than one output line, or where the supply lines are fed from different sides of the array, as may be the case for a very large array.

It will be appreciated that the invention provides a test method for bolometer elements and bolometer arrays requiring no active analogue circuitry or control. The same test method can be used to provide test stimulus for amplifiers connected to a bolometer array without any additional analogue circuitry or control.

What is claimed is:

1. A circuit comprising an array of resistance bolometer detector elements, a voltage source applying a voltage across each detector element, means for detecting infrared radiation by sensing and detecting a voltage and/or current change at a circuit connection node associated with each detector element, and means for testing the detector elements and/or their associated circuitry by applying at least two different voltages to the detector elements whereby each element is supplied by a different voltage to at least one of its immediate neighbours.

2. A circuit as claimed in claim 1 in which each detector element is arranged in series with a reference circuit element and the said circuit connection node is the connection node between the detector element and the reference circuit element.

3. A circuit as claimed in claim 2 in which the reference circuit element is a resistor.

4. A circuit as claimed in claim 2 in which the reference circuit element is a constant current source.

5. An array as claimed in claim 1 in which different voltages are applied to alternate elements of the array.

6. An array as claimed in claim 5 in which the detector elements are arranged in rows and columns and the two different voltages are applied to the elements in a chequer board pattern.

7. An array as claimed in claim 1 having means for measuring the difference in voltage between the said connection node of each detector element and the said connection node of an immediately adjacent element at a different applied voltage.

8. A method of testing an array of resistance bolometer detector elements having means for detecting Infrared radiation by sensing and detecting a voltage and/or current change at a circuit connection node associated with each detector element, the method comprising applying at least two different voltages to the elements of the array so that each element is supplied by a different voltage to at least one of its immediate neighbours.

9. A method as claimed in claim 8 comprising arranging each detector element in series with a reference circuit element and detecting the current and/or voltage change at the connection node between the detector element and the reference circuit element.

10. A method as claimed in claim 8 including the further step of forming a visual image of the array indicating the voltages present at the detector elements when at least two different voltages are applied.

11. A method as claimed in claim 8 in which the different voltages are applied in a visually recognisable pattern.

12. A method as claimed in claim 8 wherein two different voltages are applied to alternate elements of the array.

13. A method as claimed in claim 12 in which the detector elements are arranged in rows and columns and the two different voltages are applied to the elements in a chequer board pattern.

14. A method as claimed in claim 8 including the further steps of measuring the difference in voltage between the said connection node of each detector element and the said connection node of an immediately adjacent element at a different applied voltage.

15. Use of the method of claim 8 to test faults in the detector elements.

16. Use of the method of claim 8 to test faults in circuitry associated with the individual detector elements.

* * * * *

UNITED STATES PATENT AND TRADEMARK OFFICE

CERTIFICATE OF CORRECTION

PATENT NO. : 6,992,291 B2
APPLICATION NO. : 10/097482
DATED : January 31, 2006
INVENTOR(S) : Stephen George Porter, John Fox and Bhajan Singh It is certified that error appears in the above-identified patent and that said Letters Patent is hereby corrected as shown below:

Column 2, Line 42, after "generating" please insert --a difference--.

Column 2, Lines 52 and 53, please delete "the average voltage level, thus generating a difference in".

Signed and Sealed this

Twenty-eighth Day of November, 2006

JON W. DUDAS
*Director of the United States Patent and Trademark Office*